United States Patent
Hansen

(10) Patent No.: US 9,302,428 B2
(45) Date of Patent: Apr. 5, 2016

(54) METHOD FOR ACCUMULATING FOIL IN A WELDING PROCESS

(75) Inventor: Henrik Mundbjerg Hansen, Grindsted (DK)

(73) Assignee: SEELEN A/S, Esbjerg (DK)

(*) Notice: Subject to any disclaimer, the term of this patent is extended or adjusted under 35 U.S.C. 154(b) by 0 days.

(21) Appl. No.: 12/948,366

(22) Filed: Nov. 17, 2010

(65) Prior Publication Data
US 2011/0114709 A1    May 19, 2011

(30) Foreign Application Priority Data
Nov. 17, 2009  (EP) .................................. 09014335

(51) Int. Cl.
| B23K 28/02 | (2014.01) |
| B29C 65/00 | (2006.01) |
| B29C 65/18 | (2006.01) |
| B29C 65/74 | (2006.01) |

(52) U.S. Cl.
CPC ............. *B29C 66/8242* (2013.01); *B29C 65/18* (2013.01); *B29C 65/7451* (2013.01); *B29C 66/1122* (2013.01); *B29C 66/3432* (2013.01); *B29C 66/43* (2013.01); *B29C 66/80* (2013.01); *B29C 66/81417* (2013.01); *B29C 66/81457* (2013.01); *B29C 66/8322* (2013.01); *B29C 66/849* (2013.01); *B29C 66/9261* (2013.01)

(58) Field of Classification Search
CPC .... B29C 65/00; B29C 65/18; B29C 66/8322; B29C 65/7841; B29C 66/81811; B29C 66/8491; B65B 51/30

USPC .................. 228/262.1, 173.1, 173.2, 227, 228
See application file for complete search history.

(56) References Cited

U.S. PATENT DOCUMENTS

| 2,720,864 | A | * | 10/1955 | Smith ............................. 91/442 |
| 3,287,199 | A |   | 11/1966 | Virta |
| 3,553,059 | A |   | 1/1971  | Stohlquist |
| 4,115,182 | A | * | 9/1978  | Wildmoser .................... 156/515 |
| 5,326,416 | A | * | 7/1994  | Perrett ............................ 156/251 |
| 2009/0173436 | A1 | * | 7/2009 | Taylor et al. .................. 156/269 |

FOREIGN PATENT DOCUMENTS

| FR | 1303894    | 9/1962 |
| WO | 8604559 A1 | 8/1986 |
| WO | 92/08613   | 5/1992 |
| WO | 9321001    | 10/1993 |

* cited by examiner

*Primary Examiner* — Erin Saad
(74) *Attorney, Agent, or Firm* — Mollborn Patents, Inc.; Fredrik Mollborn

(57) ABSTRACT

The present invention relates to a method for welding at least one foil in a packaging process using a welding assembly, comprising the steps of directing the foil into the welding assembly, holding the foil in at least one holding point of the welding assembly, welding the foil in at least one welding point of the welding assembly, and where a part of the foil is accumulated between the at least one holding point and the at least one welding point prior to welding the foil in the welding point. The present invention further relates to a welding assembly employing this method.

12 Claims, 2 Drawing Sheets

METHOD FOR ACCUMULATING FOIL IN A WELDING PROCESS

CROSS REFERENCE TO RELATED APPLICATION

This application claims priority from application No. EP0 09014335.5 filed on Nov. 17, 2009 the contents of which are incorporated herein by reference.

FIELD OF THE INVENTION

The present invention relates to a method for accumulating foil prior to welding. The foil is used for packaging and wrapping compressible and incompressible objects.

BACKGROUND

Packaging and wrapping of products using foil is widely used in many industries. Such packed or wrapped products could be for the building industry and range from building materials such as plaster plates to glass or mineral wool. One of the primary requirements for the packaging of such products is naturally that the material wrapped around the products serves to protect the products until it is purposely broken.

When wrapping insulation materials, such as glass or mineral wool, the foil is often used as a mean for maintaining a compression of normally a stack of insulation objects. The insulation objects are compressed and then wrapped in unstretched or stretched foil, which is joined by welding. The welding is made by a welding assembly comprising two pairs of resilient jaws, between which a knife for cutting the foil is placed. Further, between the knife and the resilient jaws two pairs of welding beams for welding the foil are positioned. When the objects to be packed have been wrapped in the foil, the foil is stretched and held between the resilient jaws and at the same time clamped between the welding beams. Hereafter the foil is cut and welded at the same time.

To reduce the production costs, it is desired to reduce the amount of foil used per package. This is done by using thinner foils in the existing production facilities. However, using thinner foil is encumbered with one major problem. Regardless of the foil thickness, the thermal stress applied to the stretched foil during welding will release the tension present in the foil. This will lead the foil to creep and consequently lead to a thinning of the foil between the resilient jaws and the welding beam. When using thin foils, the thinning can reduce the yield strength of the foil below the required level or be so severe that the foil is reduced to only thin threads. There is therefore a great risk that the packaging process fails or that the finished package is torn or breaks open unintentionally.

SUMMARY OF THE INVENTION

The present invention relates to a method for welding at least one foil in a packaging process using a welding assembly comprising the steps of directing the foil into the welding assembly, holding the foil in at least one holding point of the welding assembly, welding the foil in at least one welding point of the welding assembly, and where a part of the foil is accumulated between the at least one holding point and the at least one welding point prior to welding the foil in the welding point. When the foil is welded the foil is drawn or crept towards the welding point, due to the heat in this point. Since a part of the foil has been accumulated between the welding point and the holding point, only the excess foil here is drawn towards the welding. Hereby it is avoided that the foil is over-stretched or that the welding will be too weak. Thinning of the foil between the welding point and the holding point will therefore not occur. Thus, the risk of breakage of the foil due to weaknesses in the foil and/or welding is reduced or eliminated. A packaging process using this method will therefore not fail nor will the finished package be torn or break open unintentionally.

In another embodiment the method further comprises the step of cutting the foil during welding of the foil. When using continuous foil this is particular advantageous, as this enables a continuous packaging process.

In a further embodiment the method comprises the step of clamping the foil in the at least one welding point prior to holding the foil in the at least one holding point. This is advantageous as it makes it possible to direct foil towards the welding point prior to holding the foil in the holding point, whereby foil will be accumulated between the welding point and the holding point.

In yet another embodiment the method comprises the step of clamping the foil in the welding point offset from the holding point of the foil (112), and then aligning the at least one welding point with the at least one holding point. By having the welding point and the holding point offset from each other and subsequently aligning these two points, foil can be accumulated between these two points. The length of the accumulated foil can be max. the distance between the welding point and the holding point. This distance can advantageously be adjusted according to e.g. the welding and/or foil properties.

The present invention further relates to a welding assembly for welding at least one foil comprising welding means for welding the foil, and where the welding assembly further comprises holding means for holding the foil while welding, and where the welding assembly comprises accumulation means for accumulating a part of the foil between at least one welding point of the welding means and the holding point of the holding means, prior to welding the foil. The welding assembly is advantageous in that the accumulation means ensures that a part of the foil can be accumulated between the welding point and the holding point. While welding, the foil will be drawn or crept towards the welding point of the welding means, but without weakening or breaking the foil both during and after the welding process.

In another embodiment the welding assembly comprises cutting means for cutting the foil. This is advantageous in that the welding assembly can be used in e.g. a continuous packaging process using continuous foils.

In a further embodiment the welding means of the welding assembly comprises a welding beam, at least one welding bar and a welding support. This is advantageous in that the foil can be clamped in a welding point by the welding beam and the welding, support, and further that the foil can be welded in the same welding point. In addition, the welding point can be moved independently of the holding means.

In yet another embodiment the holding means of the welding assembly comprises an upper jaw, a lower jaw and at least one resilient member. This is advantageous in that the foil can be held firmly prior to and during the welding process. By having at least one resilient member it is ensured that the foil maintains its position, thus the foil cannot slide in the holding point.

In another embodiment the accumulation means of the welding assembly is a pneumatic cylinder. Here the advantages are as mentioned above.

The present invention further relates to the use of a welding assembly as mentioned above employing the method for welding at least one foil in a packaging process also mentioned above.

BRIEF DESCRIPTION OF THE DRAWINGS

In the following, preferred embodiments of the invention will be described referring to the figures, where.

DESCRIPTION OF EMBODIMENTS

Figure 1A:
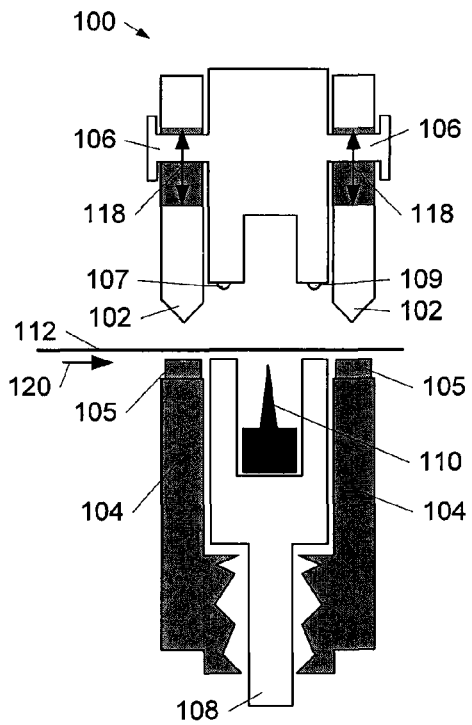
FIGS. 1a-f illustrate a number of method steps of accumulating foil prior to welding the foil.

The welding assembly 100 comprises holding means, welding means, cutting means and accumulation means. The holding means comprises an upper jaw 102 and a lower jaw 104. The lower jaw 104 comprises a resilient member 105, in which the two protrusions of the upper jaw 102 can form a recess or groove. The jaws 102, 104 can be moved vertically up and down and can hold the foil 112 in the holding point 124, 125. The welding means of the welding assembly 100 comprises a welding beam 106 and a welding support 108. The welding beam 106 and the welding support 108 are placed in between the jaws of the upper jaw 102 and the lower jaw 104, respectively. The welding support 108 can be moved vertically up and down, independently of the lower jaw 104. This movement can be enabled by accumulation means (not shown), such as a pneumatic cylinder. The welding beam 106 can be moved vertically up and down relative to the upper jaw 102. This relative movement is limited to the clearance 118 of the upper jaw 102. For illustrative purposes, the clearance 118 is only depicted in FIG. 1a. The welding beam 106 comprises two welding bars 107, 109, which can be heated e.g. by directing a current there through. When the welding beam 106 and the welding support 108 are brought together they clamp the foil 112 in the welding point 122, 123. The welding assembly 100 further comprises cutting means comprising a knife 110 for cutting the foil 112. The knife 110 can be moved vertically up and down independently of the welding support 108. The width of both the jaws 102, 104, the welding beam 106, and the welding support 108 span at least the width of the foil, but does not have to be continuous. The knife 110 also spans at least the width of the foil.

In one embodiment the foil is welded using the welding assembly 100 according to the following method. The method relates to the joining of at least two foils. The at least two foils can originate from the same roll of foil but also be from two different rolls of foil. For the sake of simplicity the at least two foils are depicted and referenced as one foil 112. The foil 112 used can be un-stretched or pre-stretched. The latter concerns a foil that has been stretched to such an extent that it is plastically deformed. This means that the foil cannot be stretched any further without breaking it.

Figure 1B:
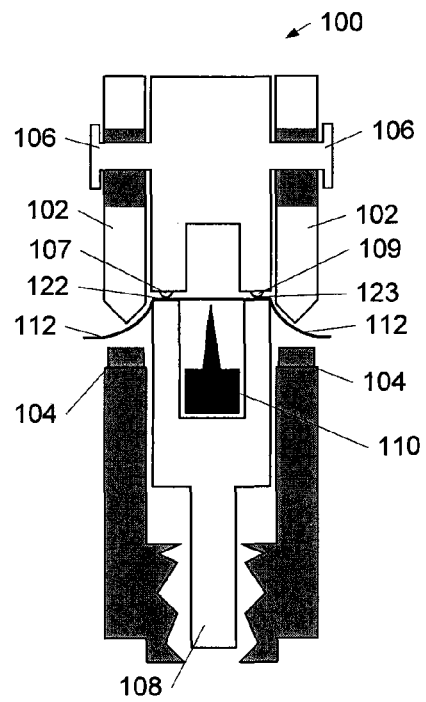
Figure 1C:
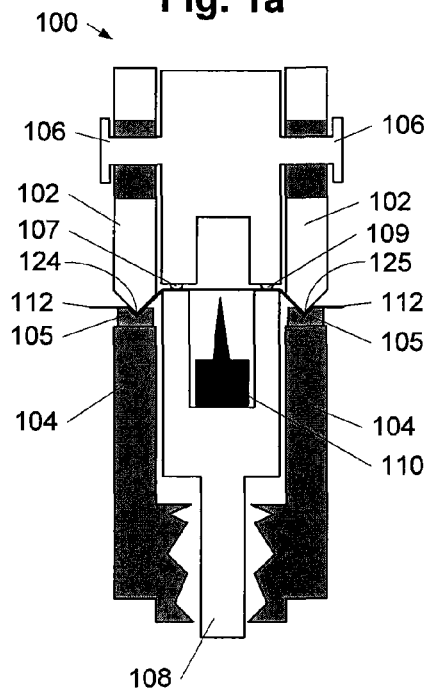
Figure 1D:
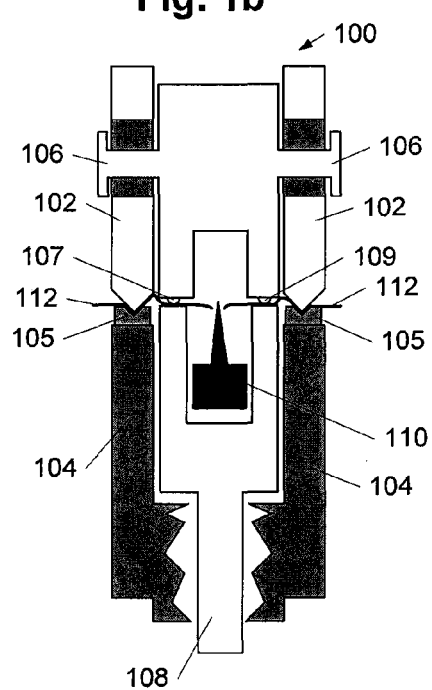
Figure 1E:
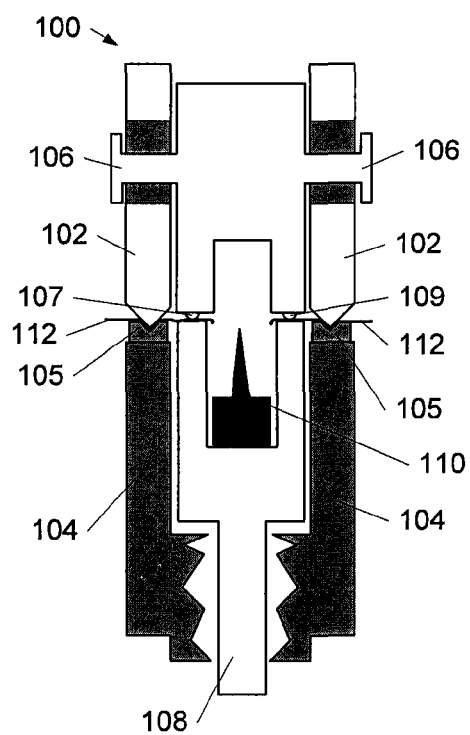
Figure 1F:
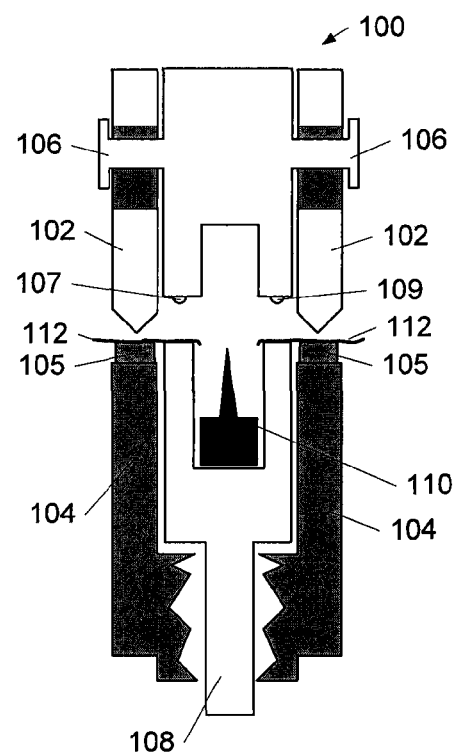

As illustrated in FIG. 1a, the foil 112 is directed or led in between the upper and lower jaws 102, 104 and the welding beam 106 and the welding support 108, which have been positioned so that they form a space there between. As depicted in FIG. 1a, the welding beam 106 is positioned vertically higher than the jaws of the upper jaw 102. The welding support 108 is then directed upwards towards the welding bars 107, 109, whereby the foil 112 is clamped in the welding point 122, 123, see FIG. 1b. This upward movement of the welding support 108 could be enabled by using accumulation means (not shown), such as actuating a pneumatic cylinder. The upper jaw 102 and thereby also the welding beam 106 are then moved downwards towards the lower jaw 104 and the resilient member 105. The downwards movement of the welding beam 106 can take place as the pressure in the pneumatic cylinder (accumulation mean) in the welding support 108 is reduced or removed. The foil 112 is now held between both upper and lower jaw 102, 104 in the holding point 124, 125 and clamped between the welding beam 106 and the welding support 108 in the welding point 122, 123. In the space between the holding point 124, 125 and the welding point 122, 123, accumulated foil 112 is now placed. The foil 112 in this confined space will typically fold in e.g. an S- or Z-shape. As illustrated in FIG. 1d, the foil 112 is hereafter cut by moving the knife 110 (cutting means) upwards and at the same time welded in the welding point 122, 123. Due to the heat, the accumulated foil 112 on both sides of the welding point 122, 123 is drawn or crept towards the welding point 122, 123. If the foil 112 is pre-stretched (plastically deformed or stretched), the foil 112 will during welding creep or be drawn more towards the welding point 122, 123, than an un-stretched foil 112. In order to provide the best possible welding, the welding support 108 can be pressed against the welding bars 107, 109 during and after welding.

This is done by activating the pneumatic cylinder of the welding support 108. Hereby it can be ensured that e.g. the transition from the performed welding and the regular foil 112 is such that the foil 112 does not break if the foil 112 is exposed to e.g. a force across the foil 112.

The steps of the method described can vary both in terms of how they are performed and the sequence of them. Thus the foil can be accumulated in many other ways between the holding point 124, 125 and the welding point 122, 123, using different accumulation means. This could e.g. be by moving the holding means and the welding means according to another method or sequence of steps. The foil could also be pre-accumulated before it is led in between the holding and the welding point. The accumulation means could also be an element or apparatus that conveys foil towards the welding point, e.g. when the welding means clamps the foil and before the foil is held in the holding point by the holding means.

The knife 110 which can be moved vertically up and down independently of the welding support 108 makes it possible to actually weld the foil 112 before cutting the foil 112 ensuring that the foil 112 has the time to be welded before cutting and further that the foil is not stressed while cutting. The possibility of independently moving the knife 110 makes it possible to ensure the correct timing between welding and cutting. The timing could depend on the amount of foil to be welded as well as the type of foil to be welded. Further, the independent movement up and down of the knife 112 as well as the vertical space within said welding support 108 makes it possible to control the extent of up and downwards movement to ensure that the foil 112 gets cut, which again could depend on the type of foil.

REFERENCES 100 welding assembly
102 upper jaw
104 lower jaw
105 resilient member
106 upper welding beam
107 welding bar
108 welding support
109 welding bar
110 knife
112 foil
118 clearance for moving the welding beam 106 relative to the upper jaw 102

120 direction of movement of the foil 112
122, 123 welding point of the welding means (106, 107, 108, 109)
124, 125 holding point of the holding means (102, 104, 105)

The invention claimed is:

1. A welding assembly for welding at least one foil, comprising:
   a holding means for holding the foil while welding, the holding means comprising an upper jaw and a lower jaw, wherein the upper jaw and lower jaw are configured to be moved up and down and to hold the foil during welding;
   a welding means for welding the foil, the welding means comprising a welding beam and a welding support, wherein:
      the welding means are placed inside the holding means,
      the welding support is configured to be moved vertically up and down independently of the lower jaw,
      the welding beam is configured to be moved vertically up and down independently of the upper jaw,
      the welding support and welding beam are configured to be moved vertically up and down as a single unit, relative to the holding means, while holding the foil;
   an accumulation means for accumulating an excess un-stretched part of said foil between at least one welding point of said welding means and at least one holding point of said holding means, such that the length of the foil between the at least one holding point and the at least one welding point is longer than the distance between the at least one holding point and the at least one welding point, wherein said accumulation of foil is obtained by clamping the foil at the at least one welding point and at the at least one holding point at a vertical distance from each other and then moving the at least one welding point and the at least one holding point vertically a variable distance towards each other to a point located between the starting point and the ending point, allowing a variable amount of accumulated foil is to be placed in a space between the holding point and the welding point; and
   a cutting means for cutting the foil, the cutting means being moveable independently of the holding means and the welding means.

2. The welding assembly of claim 1, wherein the welding means further comprises a welding beam.

3. The welding assembly of claim 1, wherein the holding means further comprises at least one resilient member.

4. The use of a welding assembly according to claim 1, in accordance with a method for welding at least one foil in a packaging process.

5. The welding assembly of claim 1, where the cutting means includes a knife.

6. A welding assembly for welding at least one foil comprising:
   a holder for holding the foil while welding, the holder comprising an upper jaw and a lower jaw, wherein the upper jaw and lower jaw are configured to be moved up and down and to hold the foil during welding; and
   a welder for welding the foil, the welder comprising a welding beam and a welding support, wherein:
      the welder are placed inside the holder,
      the welding support is configured to be moved vertically up and down independently of the lower jaw,
      the welding beam is configured to be moved vertically up and down independently of the upper jaw,
      the welding support and welding beam are configured to be moved vertically up and down as a single unit, relative to the holder, while holding the foil an accumulator for accumulating an excess un-stretched part of said foil between at least one welding point of said welder and at least one holding point of said holder, such that the length of the foil between the at least one holding point and the at least one welding point is longer than the distance between the at least one holding point and the at least one welding point, wherein said accumulation of foil is obtained by clamping the foil at the at least one welding point and at the at least one holding point at a vertical distance from each other and then moving the at least one welding point and the at least one holding point vertically a variable distance towards each other to a point located between the starting point and the ending point, allowing a variable amount of accumulated foil is to be placed in a space between the holding point and the welding point.

7. The welding assembly of claim 6, further comprising:
   a cutter for cutting the foil, the cutter being moveable independently of the holder and the welder.

8. The welding assembly of claim 7, wherein the cutter is a knife.

9. The welding assembly of claim 6, wherein the holder further includes at least one resilient member disposed between the first jaw and the second jaw, and wherein at least one holding point is formed at a contact region between the at least one resilient member and the first jaw or second jaw.

10. The welding assembly of claim 9, wherein the holding point is formed by a substantially v-shaped edge portion of the first jaw forming a depression in the at least one resilient member against the second jaw.

11. The use of a welding assembly according to claim 6, in accordance with a method for welding at least one foil in a packaging process.

12. The welding assembly of claim 6, wherein the welder further includes a movable welding beam adapted and configured to move toward and away from a movable welding support and urges the foil against the said movable welding support.

* * * * *